United States Patent [19]

Thomas

[11] 4,299,406

[45] Nov. 10, 1981

[54] MOTORCYCLE SAFETY SYSTEM

[76] Inventor: Warren R. Thomas, 38 Rivocean Dr., Ormond Beach, Fla. 32074

[21] Appl. No.: 114,003

[22] Filed: Jan. 21, 1980

[51] Int. Cl.³ .......................................... B60R 21/00
[52] U.S. Cl. ........................... 280/733; 244/122 AG; 297/464; 297/465
[58] Field of Search ...................... 280/748, 751, 733; 297/464, 465, 469, 487, 488; 244/122 AG

[56] References Cited

U.S. PATENT DOCUMENTS

| | | | |
|---|---|---|---|
| 3,074,669 | 1/1963 | Bohlin | 244/122 AG |
| 3,179,360 | 4/1965 | Shelton et al. | 297/465 X |
| 3,698,670 | 10/1972 | Ewing | 244/122 AG |
| 3,827,716 | 8/1974 | Vaughn | 280/751 X |
| 3,930,667 | 1/1976 | Osuchowski | 280/751 X |
| 4,059,852 | 11/1977 | Crane | 280/733 |

Primary Examiner—Joseph F. Peters, Jr.
Assistant Examiner—Michael Mar
Attorney, Agent, or Firm—Nolte and Nolte

[57] ABSTRACT

A system for preventing injury to a motorcyclist in the event of a crash employs a rigid framework surrounding the upper body of the cyclist and inflatable air bags which both surround the cyclist with the ballooning air cushion and also serve to draw the cyclist's legs upwardly to prevent injury during the crash. A rigid body shell may be employed to encase the torso of the cyclist, or a space frame formed of a plurality of rigid elements may be utilized to protect the cyclist in the crash. A specialized seat can be employed which serves to eject the cyclist from the cycle when a crash is either imminent or is actually occurring.

30 Claims, 11 Drawing Figures

MOTORCYCLE SAFETY SYSTEM

BACKGROUND OF THE INVENTION

Motorcycles have now become a basic mode of transportation. The proliferation of motorcycles has been due in no small part to the fact that the fuel economy is exceptionally high. Additionally, technological advances in motorcycles have made them more reliable and more powerful, thereby permitting motorcycles to be used in highway situations, as well as in urban areas.

While it may be argued that motorcycles are not inherently dangerous, the fact that the rider is in such an exposed position at the time of any crash or collision makes the operator extremely vulnerable to injury. Recently, many states have passed mandatory helmet laws, and the use of safety or crash helmets has greatly reduced the number of fatalities in motorcycle crashes. Nevertheless, bodily injuries to motorcyclists remain an issue of serious concern.

There have been various suggestions advanced for protecting the cyclist in a crash. For example, U.S. Pat. No. 3,930,667 discloses an inflatable garment for crash protection, wherein a suit worn by the motorcyclist is inflated at the instant of a collision. A similar inflatable suit is shown in U.S. Pat. No. 4,059,852. While these inflatable garments provide a modicum of protection to the cyclist, they do not prevent the broken bones and fractured limbs which often occur in a motorcycle collision. It should be noted that cyclists are frequently injured by being thrown from the cycle, and a collision with another vehicle or a fixed object is not necessarily the only situation in which injury may occur.

SUMMARY OF THE INVENTION

The present invention provides a safety system for a motorcyclist including a rigid vertically-arranged spine protector, which comprises a tube or bar to which the cyclist is loosely strapped. Air bags are provided and are inflated at the instant of a collision, or when a cycling accident occurs. The air bags serve to surround the cyclist with an inflated cushion, to securely attach him to the spine protector, and also to relocate the cyclist's legs so that the cyclist is in essentially a foetal position with his legs drawn upwardly towards his chest. This greatly diminishes the possibility of injuries to the cyclist's legs.

The torso or chest of the cyclist is shielded from injury by the use of a rigid shell, similar to a suit of medieval armor, or in an alternate embodiment a space frame constructed of individual elements is employed.

The spine protector employs a gooseneck-shaped arrangement which curves up and over the helmet of the cyclist and serves to prevent cervical injuries to the spine of the cyclist. Additionally, leg struts are provided having troughs or half-tubes affixed thereto which are adapted to receive the thighs of the cyclist. These leg struts and troughs not only aid in drawing up the legs of the cyclist, but also afford protection to the underside of the cyclist's legs during a crash.

The inflatable balloons may be arranged at the rear or back and on the chest of the cyclist. An additional balloon may be arranged beneath the special seat of the present invention. The seat balloon is used to eject the cyclist from the cycle, as well as to provide additional crash protection, once the cyclist is thrown clear. All of the balloons are armored by a suitable nylon or rayon mesh so that they are not instantly punctured or abraded upon contact with the pavement.

The pelvic area is protected by a rigid structure and, in an alternate embodiment, the pelvic area is protected by heavy durable resilient bumpers formed in a laminated construction.

The inflation of the safety balloons or air bags may occur automatically by means of a specialized crash sensing switch or may be manually actuated by the cyclist himself. Valve means are provided to permit the inflating gas or compressed air to be released from the air bags once the imminent danger is passed.

Therefore, it is an object of the present invention to provide a system for protecting motorcyclists which employs both a rigid spine protector and at least one inflatable air bag.

It is another object of the present invention to provide a motorcycle safety system which, when actuated, draws the legs of the cyclist up into a substantially foetal position to reduce the possibility of leg injuries in a collision.

It is another object of the present invention to provide a motorcycle safety system employing a specialized seat assembly having an inflatable air bag located therebeneath which, upon inflation, will eject the rider from the cycle.

The manner in which these and other objects are accomplished by the present invention will become clear from the following detailed description.

DETAILED DESCRIPTION OF THE INVENTION

Figure 1:
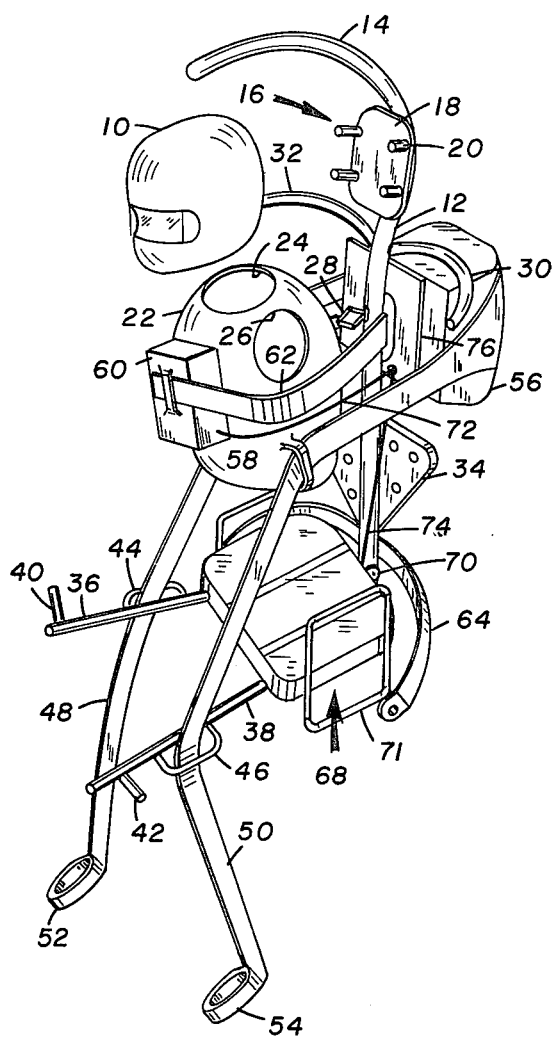
FIG. 1 is a perspective of a first embodiment of the present invention.

Referring now to FIG. 1, an embodiment of the present invention is shown as it might be affixed to a conventional motorcycle after the original two-man seat has been removed. FIG. 1 shows a conventional crash helmet 10 in the location in which it would be for a rider employing the inventive system and were he to have donned his crash helmet. An important part of the inventive system is a rigid spine protector 12 which is substantially vertically arranged and has a large crook-like portion 14 arranged at its uppermost end. The crook-like portion is intended to prevent cervical injuries to the spine of the rider. In combination with this crook-like portion 14 is a helmet locating assembly, shown generally at 16, and which comprises a concave helmet rest 18 which is preferably padded with foam or the like and a plurality of bars 20, which are in a curved arrangement having substantially the diameter of the helmet 10. The helmet locating assembly 16 is adapted to receive the helmet of the rider, when the chest air bag is inflated.

A rigid chest cage 22 is provided in the form of a medieval armor chest protector and has an aperture 24 for the neck of the rider and two armholes, one of which is seen at 26. The chest protector can be attached to the rigid spine protector by means of a folding and pivoting hinge assembly 28. This assembly will be shown in more detail hereinbelow. The chest cage 22 can be of various sizes to accommodate the different sizes of riders and, in this regard, when the climate warrants, the chest protector 22 should be sized so as to permit the rider to don bulky winter clothing. The specialized expanding hinge joint 28 permits the rider to move up and down as the specialized joint 28 slides along the rigid spine protector 12 and also, due to the expanding nature of this specialized assembly 28, permits the rider to move forward so that he may place his feet on the ground when coming to a stop for a traffic light or the like.

Two arcuately shaped shoulder protectors 30 and 32 are provided which essentially locate the shoulders of the rider and serve to act as outriggers or supports to prevent lateral impact injuries to the body of the operator. A lower back and kidney protector 34 is provided and is rigidly affixed to the spine protector 12. This kidney protector 34 may be a curved wing-like arrangement and may be perforated to provide ventilation and comfort, while still protecting the lower back of the operator. This kidney protector also acts as a stop for the rotation of the chest cage, thereby preventing torsional damage to the operator's torso, which would occur if the chest cage were driven through a revolution on the spine bar. Two rigid struts, 36 and 38, are provided, which locate the operator's legs and, in a manner to be explained hereinbelow, serve to draw the operator's legs upwardly into a folded position upon the actuation of the air bags. The leg struts, 36 and 38, each have laterally arranged projections, 40 and 42, respectively, which provide protection to the legs in the event the entire apparatus strikes the pavement in a sideways manner. Each leg strut, 36 and 38, has associated therewith a strap-locating loop, 44 and 46, respectively, through which the leg straps, 48 and 50, pass. The leg straps, 48 and 50 each have an ankle or foot loop, 52 and 54. Each leg strap continues up to the rear air bag assembly 56 where they are mutually connected or, alternately, the leg straps may be one continuous strap. The operation of this leg strap assembly will be explained in detail hereinbelow. The leg retractor straps, 48 and 50, are also located on the body shell 22 by additional locating brackets, one of which is seen at 58.

The chest air bag 60 is mounted or attached to the chest cage 22 by means of a strap 62 similar to the leg strap. The strap 62 is provided with a buckle assembly, not shown, to allow the body cage 22, which is formed in two halves or sections, to open and permit entry of the operator. The operator then simply rebuckles the belt 62 once he is inside the chest shell 22. A similar loose fitting seat belt 64 is provided which locates the rider in relation to the kidney protector 34 and the spine protector 12.

The leg struts, 36 and 38, are hingedly attached to a seat assembly, shown generally at 68. This seat assembly will be shown in more detail hereinbelow; however, at this time, it should be indicated that the seat assembly may comprise a top cushion layer and located therebeneath an inflatable air bag, all of which are assembled into a seat pan assembly, which is ultimately bolted or affixed to the main frame of the cycle. The spine protector 12 may be also hingedly affixed to the seat assembly 68 by a pivot assembly 70, which permits the rider to have a certain degree of movement while still being safely encased in the inventive assembly. Tubular bumpers or rails may also be employed at the outboard edges of the seat assembly 68, so that these rails will contact the ground upon the ejection of the seat.

The operation of the embodiment shown in FIG. 1 will be explained in more detail hereinbelow, however, it should be noted that in this embodiment at least three separate air bags are provided, a chest bag 60, a rear bag 56, and the air bag 68 located at the seat. These air bags may be inflated by any inflating means from standard compressed air tanks to apparatus employing current automative technology, which could be triggered by an automatic crash sensing system, in which case the airbags could be electrically interconnected by wires, shown typically at 72 and 74. These wires may electrically interconnect the three air bags through a suitable aperture located in the mounting plate 76, which serves to mount the rear air bag 56 against the spine protecting member 12. Nevertheless, the automatic crash sensing system is not necessary and a manual actuating system could be used as well.

Figure 2:
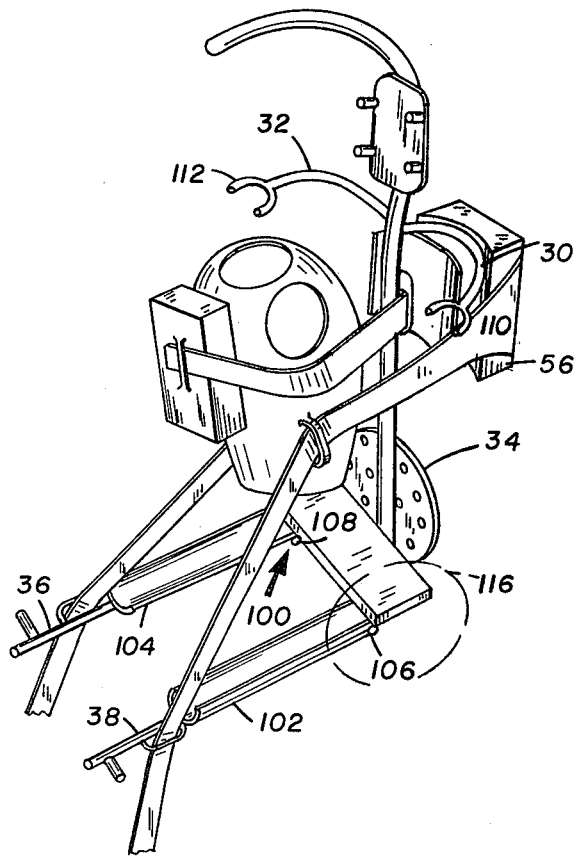
FIG. 2 is a perspective of an alternate embodiment of the present invention.

Referring now to FIG. 2, the embodiment of FIG. 1 has been modified to the extent that the seat assembly 100 is substantially shortened. Additionally, provision is made for leg tubes or troughs, 102 and 104, which are concave tubular structures adapted to receive the back part of the thigh of a cycle rider. The leg troughs, 102 and 104, are hinged in relation to the seat 100 at 106 and 108 and these hinges serve to permit the legs of the cyclist to be drawn upwardly by the leg straps upon actuation of the rear air bag assembly 56. The leg troughs, 102 and 104, serve not only to permit the legs of the cyclist to be drawn upwardly into the foetal position, but also act as shields to protect the thigh of the operator. In addition to the leg tubes, 102 and 104, additional tubes of similar structure could be employed to protect the front portion of the calves of the rider. Additionally, a hinged bar or semicircular strap could be employed at the outward end of the leg tubes to protect the knee of the rider. As a means of providing additional protection, the leg troughs, 102 and 104, could be fully padded with foam or the like.

The shoulder protection bars, 30 and 32, are provided with forked end pieces, 110 and 112, respectively, which are adapted to receive the leg struts, 36 and 38, serve to limit the travel of the leg struts, and thereby to prevent any injury to the operator caused by the present inventive safety device. Any type of forked end or the like, or a bumper, could be provided at the end of the shoulder protection bars to limit the travel of the leg tubes, 36 and 38. Additionally, a positive locking arrangement could also be provided at that location not only to limit the travel of the leg struts, but also to retain them in the drawn-up position.

Figures 8, 9:
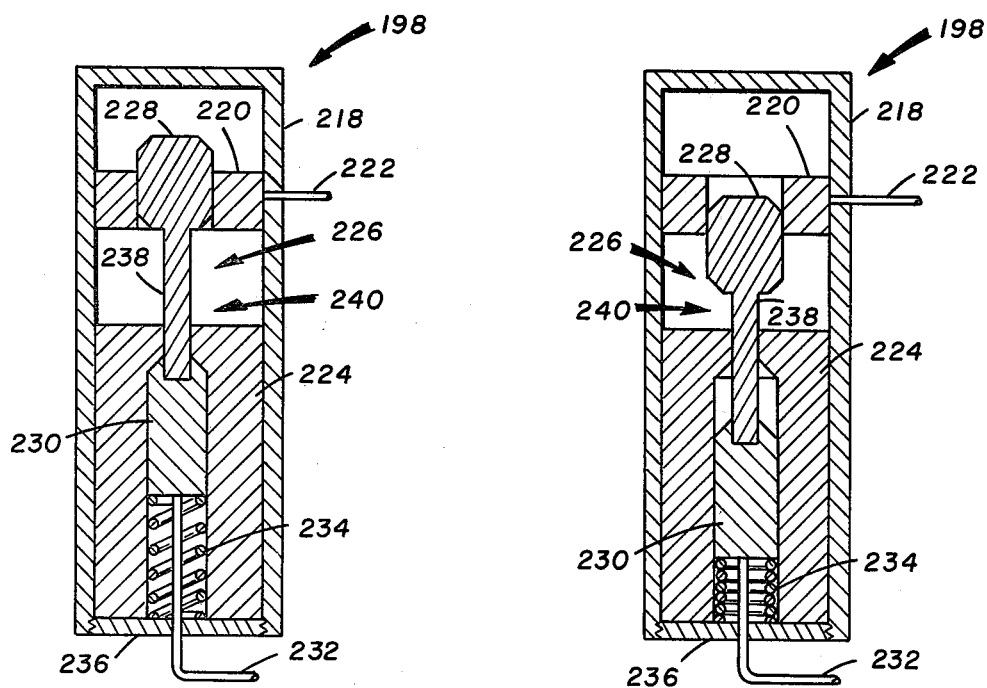
FIG. 8 is a side elevation view in cross section of a sensor used in the present invention to sense a crash situation.
FIG. 9 is the sensor of FIG. 8 in an operational mode.

The area shown by the dashed line 116 is intended to indicate the area that must be covered by side pelvic protection. Pelvic protection plates or force directors should be used, and affixed to the pelvic plates or seat sides. Additional air bags may also be advantageously employed. These air bags may be used in addition to the air bags already employed. These pelvic protectors would be located, of course, on both sides of the inventive apparatus, and could extend below the pelvic limits, as seen in FIG. 9, so that they would strike the road and the rider's pelvis would not strike the roadbed.

Figure 3:
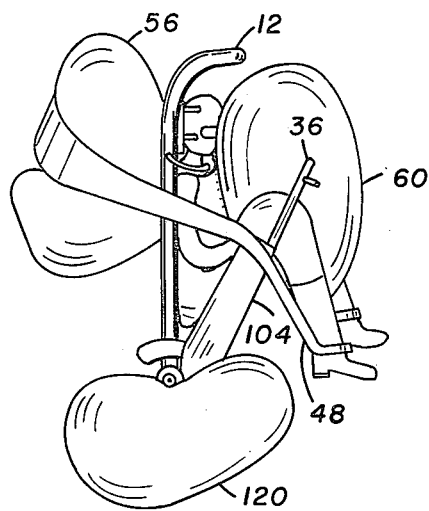
FIG. 3 is a perspective of the present invention with the air bags having been inflated.

FIG. 3 shows the inventive safety device in an actuated or inflated condition. As may be seen, when the rear air bag 56 is inflated, it not only protects the rear, back, and head of the operator, but also serves to draw the legs of the cycle operator in an upward manner so as to place the legs in a substantially foetal position. Additionally, when the front bag 60 is inflated, it completely shields the front part of the operator and would essentially cover the arms of the operator to prevent injury to them. The lower air bag 120 might be conventionally retained in the seat assembly 68 or 100 of FIGS. 1 and 2 and serves to protect the lower body portions of the operator and, depending upon the size of this air bag 120, would also tend to spread up and around and protect the legs of the operator. Also, while the seat air bag is intended to eject the rider from the cycle, a plate could be mounted to the cycle which would interact with the inflating chest air bag and serve to propel the rider in a rearward direction so that the leg struts would not interfere with the handlebars of the cycle.

Figure 4:
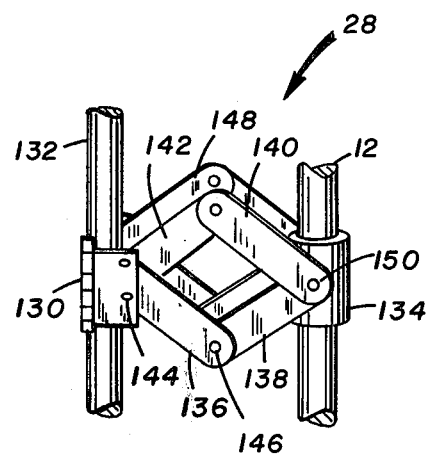
FIG. 4 is a perspective showing in detail the manner in which the body shell may be affixed to the spine protector of the present invention.

Referring now to FIG. 4, the specialized expanding hinged joint 28 of FIG. 1 is shown in more detail. This specialized hinged joint 28 permits the rider to have increased freedom of movement while being encased within the inventive safety system, specifically, the hinged assembly 28 may be bolted to the rear of the chest cage 132 by plates 130 and may be affixed to the main spine tube 12 by a tubular portion 134, having an inner diameter which is slightly larger than the outer diameter of the spine tube 12. The hinge assembly itself is made up of a plurality of hingedly attached links, such as those seen in the foreground of FIG. 4 at 136, 138, 140 and 142. Link 136 is pivotally attached to the mounting plate 130 at pivit point 144 and links 136 and 138 are pivotally attached one to another at a pivot point 146. Similarly, links 138 and 140 are pivotally attached one to another at pivot point 150, as well as to the slide tube 134, and links 140 and 142 are pivotally attached one to another at pivot point 148. It is understood that the portion of the hinge which is partially hidden in FIG. 4 is identical to the pivoting link structure described hereinabove. Meanwhile, although only one of these specialized expanding hinge joints is shown in FIG. 1, it should be understood that more than one such joint may be utilized. Additionally, the slide tube 134 could be utilized to provide a sliding interface with the chest protector and then bolting or fastening the expanding hinged joint 28 to the spine tube 12 with mounting plates similar to those shown at 130. This specialized hinged joint 28, when combined with the hinged spine protector 12, allows a great degree of freedom to the cycle operator and permits him to lean forward and extend his legs, as well as to pivot from side to side.

Figure 5:
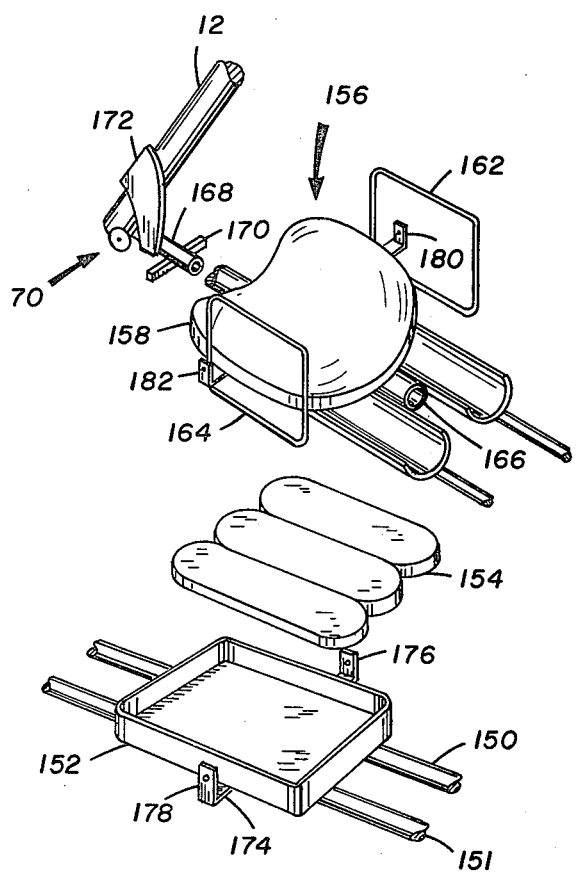
FIG. 5 is an exploded perspective of a seat assembly for use in the present invention.

FIG. 5 shows the inventive seat assembly 68 of FIG. 1 and/or 100 of FIG. 2 and, specifically, shows a manner in which the seat assembly could be arranged on the motorcycle. Bars 150 and 151 represent the upper main frame bars of the motorcycle to which the gas tank and the seat assembly might be normally attached. The assembly consists of a seat pan 152, which is welded or bolted to the main frame bars, 150 and 151, or to a slidable track.

Figure 6:
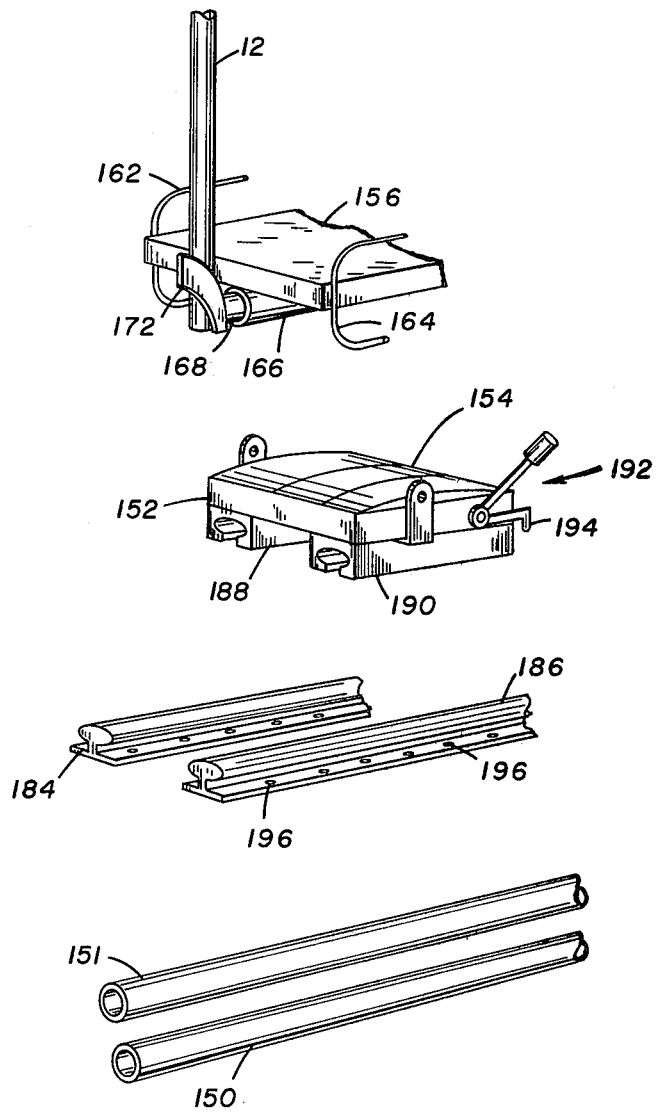
FIG. 6 is an exploded perspective of another embodiment of a seat assembly for use in the present invention.

When the motorcyclist goes on a long trip, he becomes fatigued from sitting in one position for hours. The rider is forced to slide forward and back on the cycle to rest various fatigued muscle groups by changing position. A welded seat pan possibly might be adequate on a vehicle that is only used for short trips, but it is generally conceded that sliding means for the seat pan is a necessity on a long tour such as from coast to coast. FIG. 6 illustrates one possible embodiment of a sliding seat, and will be explained in more detail hereinbelow. The seat pan 152 is arranged as a pan having upright sides and being of a height to receive the uninflated air bag 154. Mounted on top of the air bag 154 is the actual seat itself 156, which can consist of a rigid plate 158 having suitable upholstery or padding arranged thereon. Tubular elements, 162 and 164, can provide additional hip and pelvis protection, as well as acting as skids to contact the ground when the inventive ejection system is operated. The seat assembly 156 is provided with another tubular element, partially seen at 166, and which is firmly affixed to the rigid seat plate 158 and extends through to near the rear of the seat. This element 166 is adapted to receive a second tube 168 which has an outer diameter slightly smaller than the inner diameter of the mounting tube 166. Tube 168 slips inside of tube 166, until stop 170 abuts the back end of tube 166 and bottom of seat plate 158. By means of this articulation, the spine protector 12 can lean to either side to allow the rider to lean his body weight to steer the motorcycle. The bottom of the rigid seat plate 158 prevents excessive lean of the spine protector 12 by limiting movement of the stop 170. The tubes are prevented from sliding apart by a bolt which transfixes tube 168, but rides on the forward edge of 166, and acts as a second stop.

The spine protector 12 pivots forward to provide ease of movement to the operator, as well as to permit the entire assembly to be pushed forward and locked against the handle bars of the motorcycle. A travel limiting means 172 is firmly affixed to mounting tube 168 and acts to limit the vertical travel of the spine protector tube 12. A locking assembly is employed which prevents unauthorized removal of the detachable portions of the inventive safety device from the motorcycle when the operator is not in attendance. This locking mechanism locks the movable seat assembly 156 to the firmly affixed seat pan 152 with the air bag 154 located therebetween. The locking mechanism consists of a lower bar 174 which is firmly affixed or welded to the lower pan 152 and/or to the main mounting tubes of the motorcycle, 150 and 151. The lower bar 174 has two upturned tabs or ends, 176 and 178, each having a hole formed therein. These holes cooperate with holes formed in similarly arranged tabs, 180 and 182, or the like on the movable part of the seat assembly 156. It is intended that two locks or a bar with one lock be placed through the aligned holes in the tabs when the motorcycle is unattended. The means for actuating and/or inflating the balloon or air bag 154 are not shown in FIG. 5, in order not to over-complicate the figure. It should be understood, however, that the system used to inflate the air bags can be of conventional design.

FIG. 6 is an embodiment of the present invention employing a sliding seat. Attached to the frame bars, 150 and 151, of the cycle are tracks 184 and 186, or a single track could be used. Such tracks are oriented along the longitudinal axis of the motorcycle. The seat pan 152 has means, 188 and 190, affixed to its bottom which cooperate with the track. This permits the seat to slide freely along the tracks. A retaining mechanism 192 includes a pin 194 which cooperates with one of a plurality of holes 196 formed in track 186, which acts to stop the seat at any desired location along its length of travel.

Figure 7:
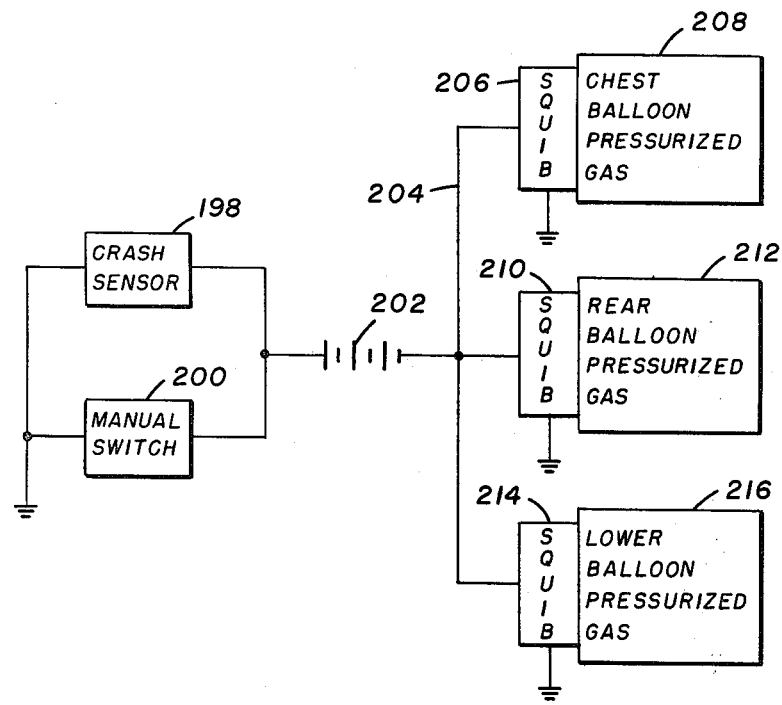
FIG. 7 is a block diagram of the circuit used to actuate the air bags of the present invention.

FIG. 7 shows a proposed system suitable for use in actuating the inventive air bag system. This system employs an automatic crash sensing unit 198 and a manual switch 200, these switches are connected in parallel one to another and in series with a battery 202 and an electrical ground connection. The other side of the battery 202 is connected by a suitable electrical conductor 204 to an actuator or squib 206, which is used to release the gas 208 to cause the chest air bag 60 to be inflated. Similarly, another squib 210 may be used to release the gas 212 which inflates the rear air bag 76. Another squib 214 is connected to the battery 202 and releases the gas 216 to inflate the lower or seat air bag 154. Each of the squibs 206, 210, and 214 are also connected to the same electrical ground as were the switches 198 and 200. In this manner actuation of either of the two switches will then connect the squibs to the battery through ground, thereby completing the circuit and causing the squibs to detonate and release the gas. It should be understood, of course, that this embodiment is shown by way of example only and that the entire gas air-bag system could be actuated simply by a hand release mechanism which could release gas stored in a single cylinder, in order to inflate all the air bags.

FIG. 8 is an example of a crash sensor 198 which could be employed in the present invention. It being understood, of course, that any conventionally available crash sensor could be advantageously employed, provided that it is not overly sensitive. The crash sensor 198 consists of a cylindrical tube 218 which has mounted in the top portion thereof, a contact ring 220. An electrical conductor 222 is connected to the contact ring 220 and is either connected to ground or to the battery. Also mounted inside the main cylindrical tube 218 is an insert member 224, which serves to locate the spring rod contact assembly 226 in the body 218 of the crash sensor. The flexible rod contact assembly 226 includes a contact member 228 and a cylindrical weight slug portion 230 to which is attached an electrical lead 232 connected to the appropriate terminal, i.e., the battery or ground. A spring means 234 is attached to the base portion 230 of the contact assembly 226 in an upward manner and is contained within the assembly 198 by a lower threaded end element 236.

The operation of the inventive crash sensor 198 is such that upon undergoing a sudden blow or concussion, the spring 238 will flex due to the forces of inertia and permit the contact member 228 of the assembly 226 to contact the ring contact 220, thus completing the circuit, and automatically inflating the air bags.

A vehicle can run into holes in the road and jolts will be applied to the cycle in a specific manner, which is not a crisis warning but merely the symptoms of an unpleasant ride, such as when a rider leaps over the crest of a hill and becomes airborne for a second before landing on the road again. Such shocks generally come from one specific localized direction, e.g., directed up and to the rear through the front forks. The inventive sensor cancels such road shocks in a manner shown in FIG. 9.

Referring then to FIG. 9, the sensor 198 is oriented in the motorcycle in an upright fashion, possibly aligned with the front forks, such that when the cycle leaps in the manner described above, the resultant force causes the weight slug 230 to slide down the tube insert 224 and compress spring 234. This action draws the spring rod 238 down into the narrow collar portion 240 at the top of insert member 224, which shortens the permissable arc of the contact 228. Thus, the shortened spring rod 238 cannot bend far enough over to permit the contact 220 and 228 to touch.

Figure 10:
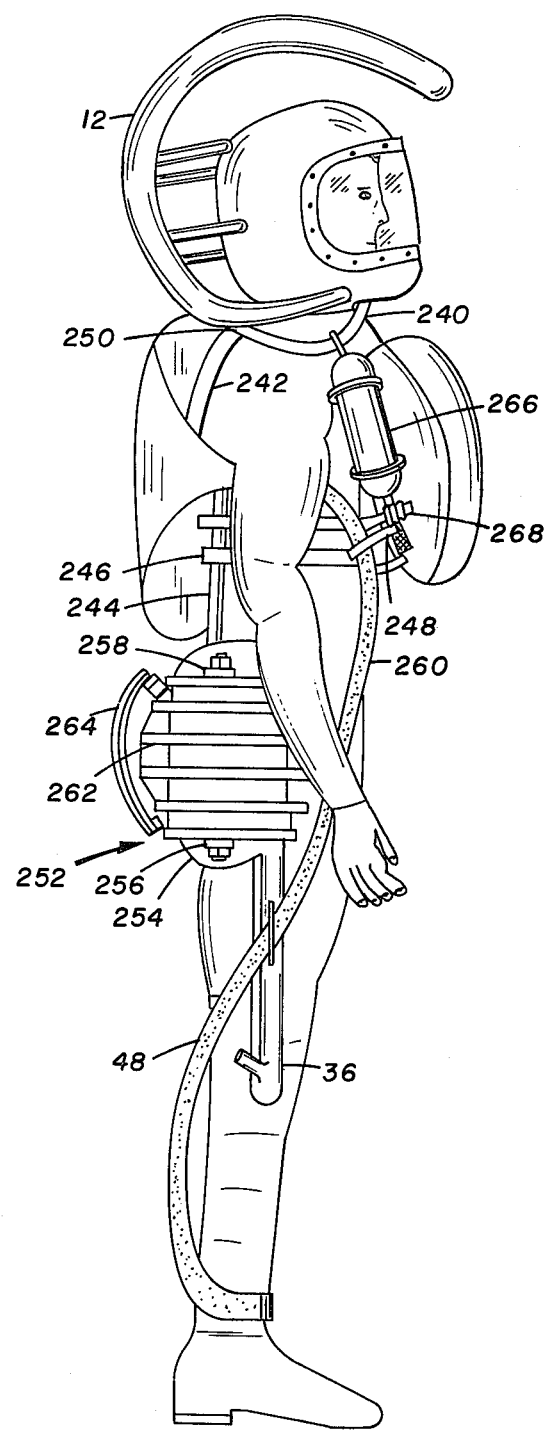
FIG. 10 is a side elevation of another alternate embodiment of the present invention.
Figure 11:
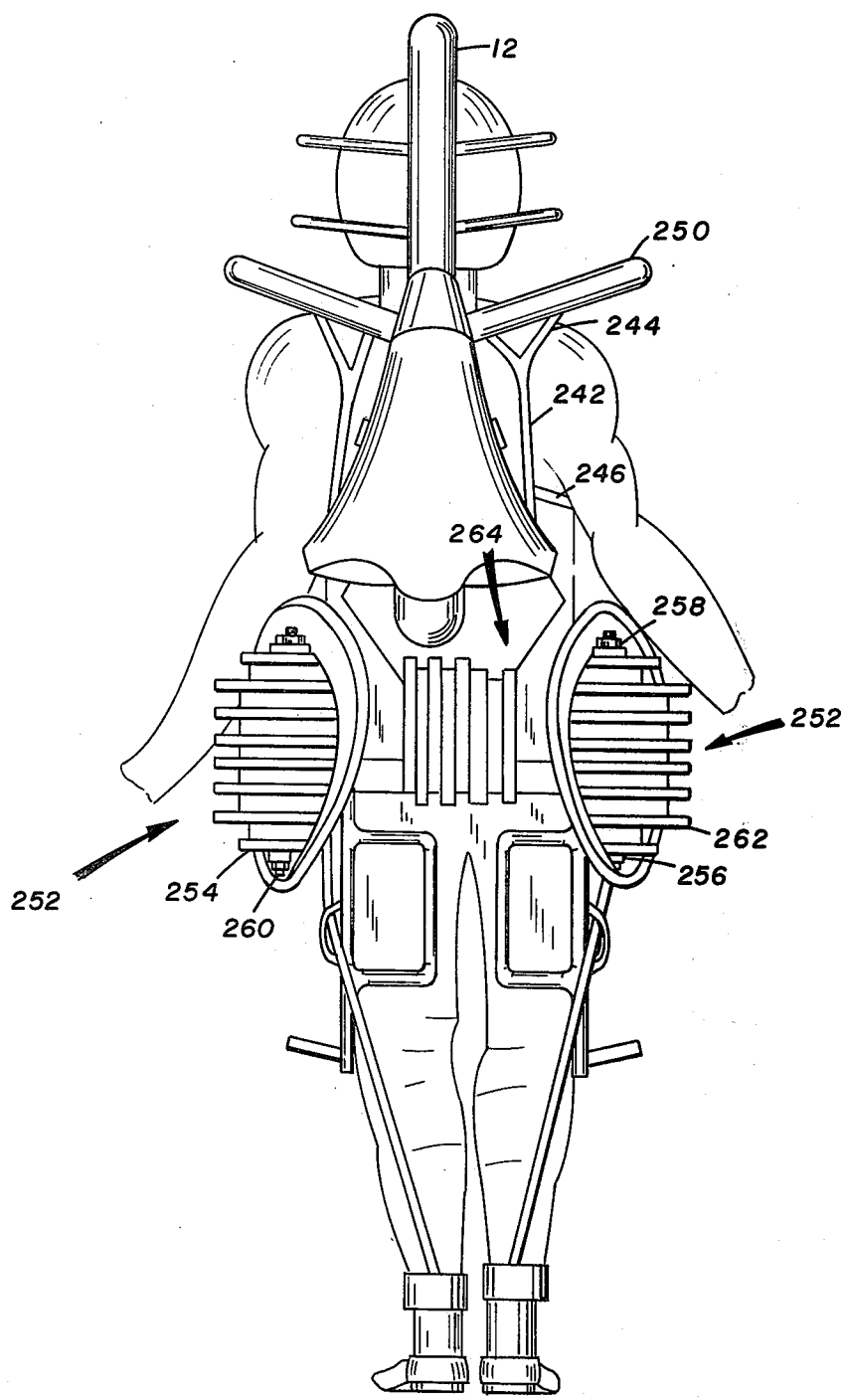
FIG. 11 is a rear elevation view of the embodiment shown in FIG. 10.

FIGS. 10 and 11 show another embodiment of the present invention wherein certain of the specific structural features of the invention are provided in a different manner. For example, the main chest protector 22 of FIG. 1 was originally shown as a rigid shell that completely surrounded a portion of the torso of the operator. This rigid assembly has been replaced in the embodiment of FIGS. 10 and 11 with an open space frame, made up of individual structural elements welded together and forming a rigid structure. The elements are shown at 240, 242, 244, and 246. It is understood, of course, that additional elements of this inventive space-frame, upper-body protector are also employed but are not seen in FIGS. 10 and 11. A curved shoulder protection bar 250 is employed and this bar may also be provided with specially adapted ends which would receive and/or positively lock the movable leg struts, 36 and 38. In this embodiment, in lieu of the kidney protector 34 of FIG. 1, a specialized hip and lower spine protection assembly 252 is employed. This assembly consists of base plate 254, which has two tabs or locating elements, 256 and 258, through which a bolt assembly 260 is passed. Located between these two locating elements, 256 and 258, are a series of disks or slabs 262 which are formed of resilient material, such as the rubber found in conventional automobile tires. These slabs may be arranged in a stack, where the dimensions of the plate-like elements determine the resiliency of the hip and pelvic protector. Additional layers 264 of the plate-like elements may be provided at the rear of the hip and pelvis protector in order to prevent injury to the lower back and coccyx of the operator.

In the embodiment of FIGS. 10 and 11, in lieu of the squib assembly and automatic sensor of FIG. 7, the inflating gas is contained within a conventional gas bottle 266 and a manual valve 268 is provided, which permits the motorcycle operator to inflate the front and rear air bags by means of the gas bottle 266.

Although the embodiment of FIGS. 10 and 11 appears to be quite cumbersome for walking, it is pointed out that the present invention is not intended to be donned and have the operator walk about, rather it is to be mounted on the motorcycle with the operator then placing himself into the protective environment. FIGS. 10 and 11 show a standing figure in order to illustrate more clearly the inventive portions of the assembly.

As an alternative to retaining the inflating gas in the gas bottle 266, the gas could be retained within the hollow tubular main spine protector 12. Additionally, in regard to FIGS. 10 and 11, because the heavy resilient hip and pelvic protecting system is provided, it may not be necessary to employ a lower air bag and thus would be not necessary to employ the specialized seat assembly as shown, for example, in FIG. 5, in which case only a sling or pivoting rigid contour seat bottom could be provided and extensive modification or alteration to the existing motorcycle seat would not be required.

As an example of the operation of the present invention, in the event of a mishap, the operator of the motorcycle operates a manual switch to release the gas and inflate the protective air bags, or a crash sensor, such as the one shown in FIG. 8, automatically releases the gas to the air bags. If the motorcycle safety system employs a seat air bag, the operator is lifted from the cycle by the inflation of this bottom air bag. The front air bag inflates to protect the chest of the operator and the rear air bag acts in conjunction with the vertical spine protection bar to protect the back of the operator. When the rear air bag inflates, this also pulls in the slack in the leg straps and the operator's legs are drawn upwardly and the troughs on the leg struts protect the back of the operator's thighs from injury. The leg struts may be limited in the extent of their travel by interaction with the shoulder protection bars. The inflated air bags protect the operator from general injury and the vertical spine protection bar protects the motorcycle operator from a serious spinal injury.

In addition to the specific features provided by the present invention, as described above, other features and/or advantages which are present, may not be obvious from the present drawings. For example, the main spine protector 12 can be lined or covered with safety cushioning which will serve further to protect the medial portion of the rider's spine. Additionally, the inside of the chest protector 22 could also be padded or lined with such cushioning. An inflatable cervical collar could also be incorporated into the present invention and become part of the described embodiments. Such cervical collar could be easily placed around the motorcycle operator's neck and inflated at the same time that the air bags are inflated. The air bags provided in the present invention are all covered with a suitable armor, such as nylon or rayon mesh, which prevents them rubbing through and losing their air pressure upon contact with the pavement. Additional large balloons could also be employed which would act as brakes to slow down the entire assembly. Also, the present assembly is somewhat bulky and would essentially prevent the motorcycle operator from being run over by a car, rather, once the bags are inflated the inventive safety system would be just moved around in the street and not run over by an oncoming vehicle. The present invention contemplates that conventional air bag technology be employed, such technology being available from the ongoing air-bag research relative to conventional automobiles. Finally, it is to be noted that a release means is provided to permit either the operator or the attending personnel to permit the gas to escape from the air bags so that the operator may be free to move about once again.

It is understood, of course, that the foregoing is presented by way of example only, and is not intended to limit the scope of the present invention, except as set forth in the following claims.

What is claimed is:

1. A device for protecting an occupant of a motor vehicle, said device comprising:
   a rigid element mounted on the motor vehicle and being vertically arranged for protecting the spine of the occupant and extending up over the head of the occupant;
   a rigid chest protection means attached to said rigid element and being of a size to envelope the upper torso of the occupant, and having apertures therein to permit the occupant's arms to extend therethrough;
   a first inflatable air bag means arranged in the front of said chest protection means;
   a second inflatable air bag means arranged in the back of said chest protection means;
   means for inflating said first and second air bag means;
   means for actuating the inflating means; and strap means extending around said second inflatable air bag means for drawing the legs of the occupant upwardly towards said rigid chest protection means upon inflation of said second inflatable air bag means, said air-bags being disposed so that when said first and second air bag means are inflated, said first air bag means protects the front of the occupant and said second air bag means protects the rear of the occupant.

2. The device of claim 1, wherein said rigid element includes an occupant seat means affixed to the lower end of said rigid element and detachably affixed to a frame member of the vehicle and a third inflatable air bag arranged beneath said occupant seat means and being connected to be inflated by said means for inflating, whereby upon inflation said third air bag means protects the lower body portion of the occupant.

3. The device of claim 1, further comprising pelvis and hip protection means attached to the lower end of said rigid element and arranged to substantially encompass the pelvic area of the occupant.

4. The device of claim 1, further comprising locating means affixed to said rigid element at a level approximately at the location of the head of the occupant for receiving and protecting the head of the occupant during a mishap involving the vehicle.

5. The device of claim 2, wherein said occupant seat means includes means pivotally attached to the lower end of said rigid element so as to permit said rigid element to tilt and to accommodate the movements of the occupant.

6. The device of claim 1, wherein said rigid chest protection means includes a rigid shell which is formed in at least two sections relatively movable to permit the occupant to gain access to said shell.

7. The device of claim 1, wherein said rigid chest protection means includes a space frame formed of a plurality of elements rigidly fastened one to another.

8. The device of claim 1, further comprising shoulder protection bars affixed to said rigid element at a level proximate the shoulder level of the occupant and extending substantially horizontally outwardly from said vertically arranged rigid element.

9. The device of claim 2, further comprising leg struts pivotally attached to said occupant seat means and extending outwardly therefrom toward the front of the vehicle and each having a guide loop through which said strap means passes for locating said strap means.

10. The device of claim 9, further comprising means for limiting the upward travel of said leg struts.

11. The device of claim 1, further comprising means for limiting the upward travel of said leg struts.

12. The device of claim 1, further comprising leg struts pivotally attached to said seat means and extending outwardly therefrom toward the front of the vehicle, and a trough-like member affixed to each of said leg struts and arranged opening toward the head of the occupant for receiving the thighs of the occupant.

13. The apparatus of claim 1, wherein said means for actuating the inflating means includes an automatic crash sensor means.

14. The device of claim 1, further comprising stop means for limiting the extent of travel of said chest protection means about a vertical axis.

15. The device of claim 14, wherein said stop means comprises a plate attached to said rigid element.

16. The device of claim 15, wherein said plate is positioned on said rigid element so as to protect the kidneys of the occupant.

17. The device of claim 3, wherein said hip protection means includes a plurality of resilient elements for absorbing impacts applied thereto.

18. The device of claim 1, further comprising a releasable seat means including a seat pan mounted on the frame of the motor vehicle, an inflatable air bag arranged in said seat pan and connected to the inflating means, and a cushioned seat means arranged on said inflatable air bag and having a frame to which said elongate element is pivotally attached.

19. The device of claim 18 wherein said seat pan is attached to the frame of the motor vehicle by slide means which permits relative sliding motion between the seat pan and the motor vehicle.

20. The device of claim 19 further comprising means to selectively prevent said relative sliding motion between said seat pan and the motor vehicle.

21. A safety system for protecting the rider of a motorcycle in the event of a mishap, comprising:
an elongate element pivotally attached to the motorcycle at the rear of the rider seat and being arranged vertically to extend at least as high as the head of the rider;
a rigid torso enclosure attached to said elongate element for protecting the torso of the rider;
inflatable air bag means arranged on the exterior of said rigid torso enclosure;
means for inflating said air bag means;
means for actuating said means for inflating said air bag means; and
means attached to said inflatable air bag means and to the legs of the rider including strap means extending around said inflatable air bag means for drawing the legs of the rider upwardly into a folded position upon inflation of said inflatable air bag means, said air-bag means cooperating to protect the rider from injury.

22. The system of claim 21, wherein said means attached to said air bag means includes two rigid leg struts pivotally attached to the rider seat, and said strap means extending through guide means on said leg struts, from the legs of the rider to said inflatable air bag means.

23. The system of claim 22, further including trough means affixed to each of said leg struts for receiving the back portion of the thighs of the rider.

24. The system of claim 17, wherein said inflatable air bag means includes a first inflatable air bag arranged on the front of the torso enclosure and a second inflatable air bag arranged on the back of the torso enclosure, both first and second air bags being connected to said means for inflating said air bags.

25. The system of claim 17, wherein said torso enclosure includes a rigid shell enclosing at least a portion of the torso of the operator, being formed of at least two segments, relatively movable and having a plurality of apertures to permit the head and arms of the rider to protrude therethrough.

26. The system of claim 17, wherein said torso enclosure includes a space frame formed of a plurality of elements rigidly attached to each other to form a frame.

27. The system of claim 17, further comprising a releasable seat means including a seat pan mounted on the frame of the motorcycle, an inflatable air bag arranged in said seat pan and connected to the inflating means, and a cushioned seat means arranged on said inflatable air bag and having a frame to which said elongate element is pivotally attached.

28. The system of claim 27 wherein said seat pan is attached to the frame of the motorcycle by slide means which permits relative sliding motion between the seat pan and the motorcycle.

29. The system of claim 28, further comprising means to selectively prevent said relative sliding motion between said seat pan and the motorcycle.

30. The system of claim 21, further comprising means for movably attaching said rigid torso enclosure to said elongate element.

* * * * *